US007293452B2

(12) United States Patent
Vibert et al.

(10) Patent No.: US 7,293,452 B2
(45) Date of Patent: Nov. 13, 2007

(54) METHOD OF MEASURING AMBIENT PRESSURE IN A TURBOCHARGED ENGINE

(75) Inventors: Patrick Vibert, Revel (FR); Roger Rouphael, L'Union (FR)

(73) Assignee: Siemens VDO Automotive, Toulouse (FR)

( * ) Notice: Subject to any disclaimer, the term of this patent is extended or adjusted under 35 U.S.C. 154(b) by 0 days.

(21) Appl. No.: 10/550,686

(22) PCT Filed: Mar. 19, 2004

(86) PCT No.: PCT/EP2004/002887

§ 371 (c)(1),
(2), (4) Date: Jul. 10, 2006

(87) PCT Pub. No.: WO2004/085811

PCT Pub. Date: Oct. 7, 2004

(65) Prior Publication Data

US 2007/0137288 A1 Jun. 21, 2007

(30) Foreign Application Priority Data

Mar. 26, 2003 (FR) .................................... 03 03702

(51) Int. Cl.
*G01M 15/00* (2006.01)

(52) U.S. Cl. .................................................... 73/117.3

(58) Field of Classification Search .................. 73/112, 73/115, 116, 117.2, 117.3, 118.1, 118.2; 701/29, 701/99, 101

See application file for complete search history.

(56) References Cited

U.S. PATENT DOCUMENTS

| | | | | |
|---|---|---|---|---|
| 4,951,647 | A | 8/1990 | Ezumi et al. | |
| 5,605,044 | A * | 2/1997 | Zimmer et al. | 60/602 |
| 6,016,460 | A | 1/2000 | Olin et al. | |
| 6,134,888 | A * | 10/2000 | Zimmer et al. | 60/600 |
| 6,314,794 | B1 * | 11/2001 | Seigeot | 73/40.7 |
| 6,430,515 | B1 | 8/2002 | Sanyal | |
| 6,434,474 | B1 | 8/2002 | Kotwicki et al. | |
| 6,445,996 | B1 | 9/2002 | Corbeels et al. | |
| 6,499,299 | B2 * | 12/2002 | Propernick | 60/602 |
| 2002/0029764 | A1 | 3/2002 | Machida et al. | |

FOREIGN PATENT DOCUMENTS

| | | |
|---|---|---|
| FR | 2 813 099 | 2/2002 |

* cited by examiner

*Primary Examiner*—Eric S. McCall
(74) *Attorney, Agent, or Firm*—Young & Thompson

(57) ABSTRACT

A method of determining the ambient pressure which is performed in a turbocharged engine having a throttle which is disposed between a heat exchange chamber, known as an intercooler, and an intake manifold. A compressor is provided in order to compress the air in the heat exchange chamber, and the engine is equipped with elements for indicating the pressure in the chamber. The method includes the following steps: detecting the opening of the throttle; measuring the pressure (MAP_UP) in the heat exchange chamber; and determining the ambient pressure (AMP) by measuring the pressure (MAP_UP) in the heat exchange chamber at a predetermined moment which is defined in relation to a characteristic point of the curve (24) representing the pressure (MAP_UP) in the heat exchange chamber as a function of time, the ambient pressure (AMP) being equal to the pressure measured in the heat exchange chamber.

12 Claims, 2 Drawing Sheets

METHOD OF MEASURING AMBIENT PRESSURE IN A TURBOCHARGED ENGINE

Figure 1:
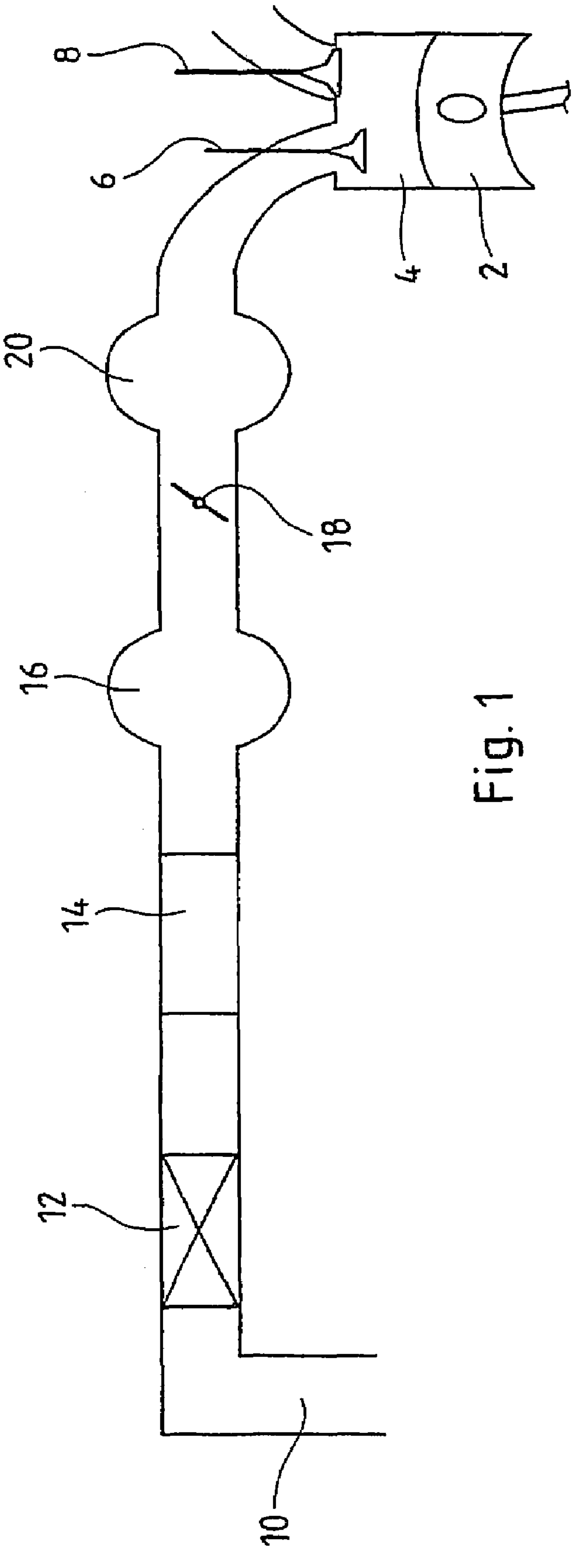

The present invention relates to the measurement of ambient pressure in a turbocharged engine.

An atmospheric or turbocharged engine is sensitive to the ambient atmospheric pressure. This is because the cylinders of the engine are filled in different ways under the effect of this pressure. In an atmospheric engine, the pressure at the intake manifold does not differ greatly from atmospheric pressure, and the variations of pressure in the manifold with respect to atmospheric pressure, as a function of the engine load and speed in particular, are well known. In an engine of this kind, therefore, knowledge of the pressure in the intake manifold enables the ambient pressure to be determined, if certain parameters are taken into account.

In a turbocharged engine, as in an atmospheric engine, there is a butterfly valve which regulates the flow of air supplied to the engine. A heat exchange chamber called an intercooler, supplied by a compressor of the turbocharger, is located upstream of this butterfly valve and the intake manifold is located downstream of the butterfly valve.

The pressure in the engine is therefore strongly influenced by the compressor of the turbocharger. A turbocharged engine is therefore commonly provided with an external pressure sensor, so that, in particular, the boost pressure provided by the turbocharger can be estimated. There is also a pressure sensor in the heat exchange chamber and another in the intake manifold, for the regulation of the engine. The boost pressure of the turbocharger, upstream of these chambers, is highly variable and this inevitably prevents any measurement of the ambient pressure in the heat exchange chamber or in the intake manifold except in special cases where this supercharging pressure is negligible (or known).

The object of the present invention is to provide, for a turbocharged engine, a method for determining the ambient pressure without the use of a special sensor.

For this purpose, it proposes a method for determining the ambient pressure in a turbocharged engine having a butterfly valve placed between a heat exchange chamber and an intake manifold, a compressor being provided to compress the air in the heat exchange chamber and the engine being fitted with means for indicating the pressure present in the heat exchange chamber.

According to the invention, this method comprises the following steps:

detecting an opening of the butterfly valve, measuring the pressure in the heat exchange chamber, determining the ambient pressure by measuring the pressure in the heat exchange chamber at a predetermined instant defined with respect to a characteristic point on the curve of pressure in the heat exchange chamber as a function of time, the ambient pressure then being equal to the pressure measured in the heat exchange chamber.

This method of determining the ambient pressure is based on the finding that, when the butterfly valve opens, the pressure in the heat exchange chamber initially decreases, passes through a minimum value, and then increases above its initial value. It has been found in this case that this pressure falls below ambient pressure, and then rises again above the latter. Thus the pressure in the heat exchange chamber is equal to the ambient pressure at two separate instants when the butterfly valve is opened. It is therefore simply necessary to read the pressure in the heat exchange chamber when it is equal to the ambient pressure in order to find the latter value. Since the variation of the pressure in the heat exchange chamber when the butterfly valve is opened is always of the same type, this determination can be carried out for a given engine on the basis of calibration measurements carried out once for all during the adjustment of the engine.

In one embodiment of the method according to the invention, each determination of the ambient pressure is stored, and a further determination is only carried out if the pressure measured in the heat exchange chamber falls below the stored value of ambient pressure measured previously. In this case, it is possible to store all the measured values of ambient pressure, but it is also possible to store only the last value measured.

To achieve a more reliable determination, it is preferable to check, during the measurement of the pressure in the heat exchange chamber, that the measured pressure passes through a minimum value within a predetermined period after the opening of the butterfly valve.

Different characteristic points can be chosen as reference points on the curve of pressure in the heat exchange chamber for the determination of the ambient pressure. In a preferred embodiment of the present invention, the characteristic point chosen is the point on the curve corresponding to the minimum value of the pressure measured immediately after the opening of the butterfly valve. The ambient pressure is then determined, in this preferred embodiment, by measuring the pressure in the heat exchange chamber after an elapsed time defined after the detection of this minimum value. In this case, the elapsed time is advantageously defined as a function of the engine speed.

In the method according to the invention as described above, the ambient pressure is determined when the butterfly valve is opened. This normally happens fairly frequently in the course of an automobile journey. For example, the ambient pressure can be determined at every gear shift. The invention also proposes the determination of the ambient pressure in other conditions in order to provide information on this pressure more frequently to the corresponding engine control and management device. It would also be possible to determine the ambient pressure before the engine is started, the ambient pressure being equal to the pressure in the heat exchange chamber in this case.

The ambient pressure can also be measured when the butterfly valve is closed, in which case the pressure difference between the pressure measured in the heat exchange chamber and the ambient pressure is known as a function of the engine speed. This pressure difference varies from one engine to the next, but it can be standardized for one engine.

Finally, if the butterfly valve does not open in the course of a journey and does not close, but remains substantially in the same position for a long period, the ambient pressure can be calculated by an open loop method, for example, being decreased by a given value for each time interval. In this case it is assumed that the corresponding vehicle is traveling uphill and the ambient pressure is therefore decreasing as the vehicle gains height.

Figure 2:
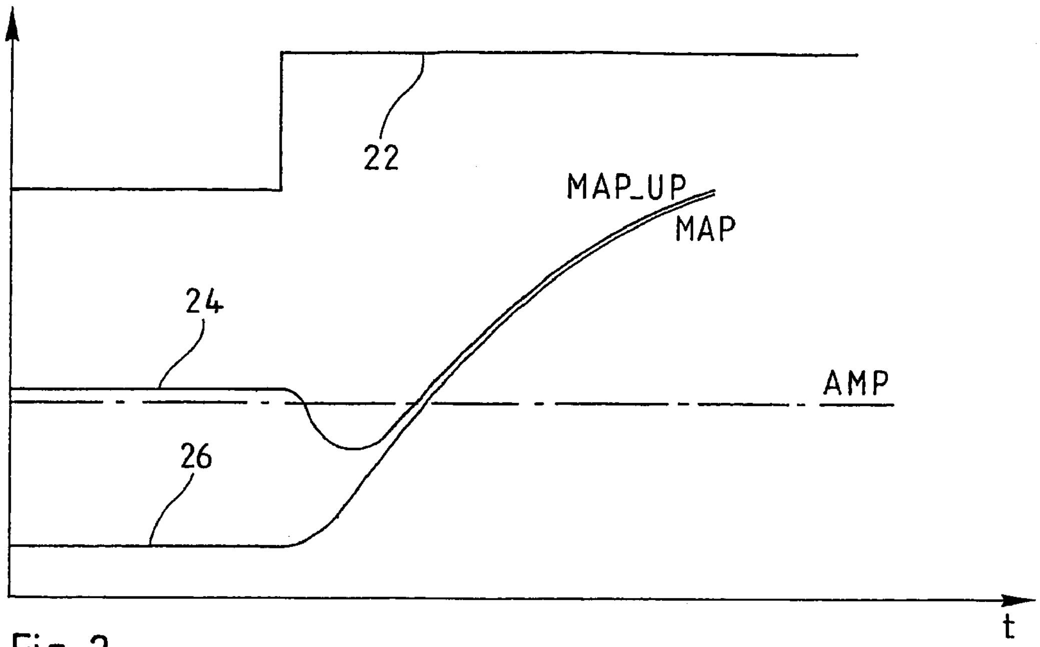
Figure 3:
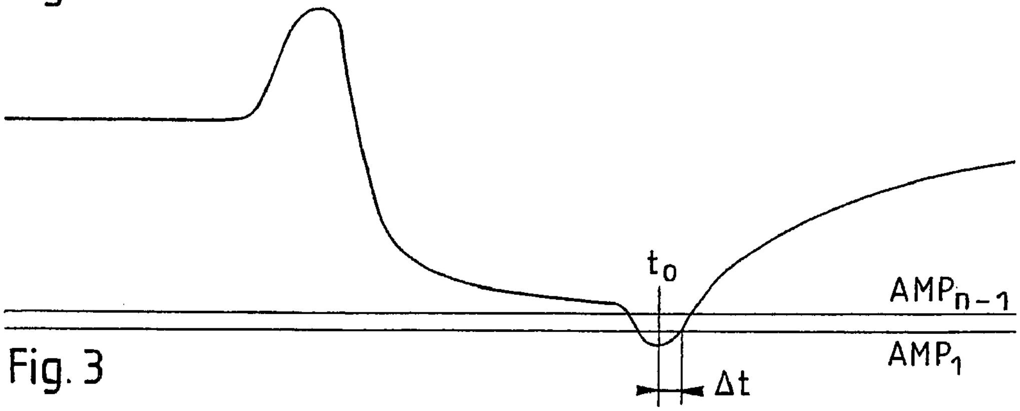
Figure 4:
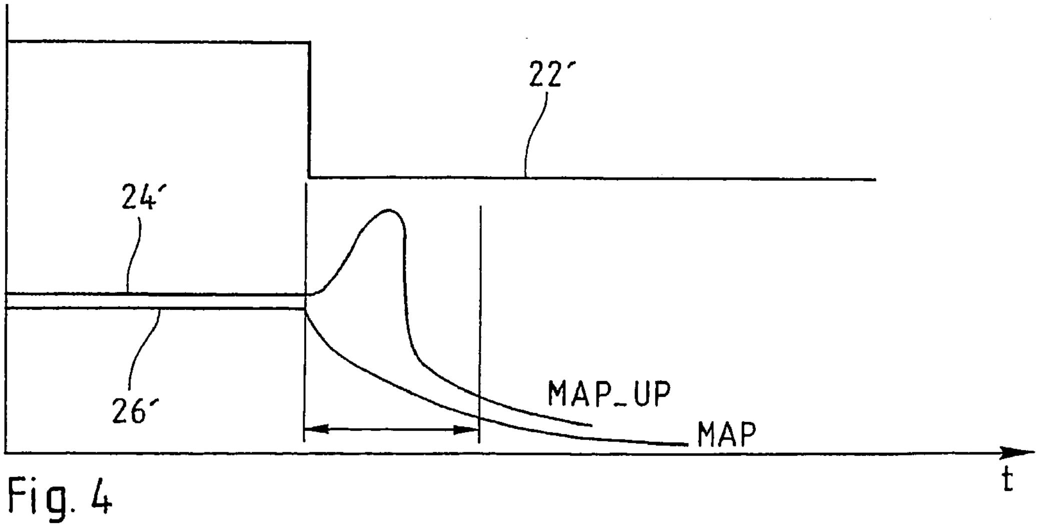

Details and advantages of the present invention will be made clearer by the following description, provided with reference to the attached schematic drawing, in which:

FIG. 1 shows schematically an air supply system of a turbocharged engine, and FIGS. 2 to 4 are diagrams showing on the same graph, in different situations, the positions of the butterfly valve of FIG. 1 and the pressures in the heat exchange chamber 16 and in the intake manifold of this FIG. 1.

FIG. 1 shows in a highly schematic way an air supply system of a turbocharged engine, and a piston 2, moving in a cylinder 4, can be seen on the right-hand side of this figure, in other words downstream of the illustrated intake system. A valve 6 controls the admission of air into the cylinder 4. Another valve 8 is provided for the discharge of the burnt gases from the cylinder 4. The corresponding engine has a plurality of cylinders, for example. The intake system is common to all the cylinders or to a set of cylinders.

The air supply system shown in FIG. 1 comprises, from the upstream to the downstream end, an air intake 10, a mass air flow meter 12, a compressor 14 of a turbocharger, a heat exchange chamber 16, called an intercooler 16, a butterfly valve 18 for varying the air flow cross section, and an intake manifold 20. The intake valves 6 are directly linked to the intake manifold 20.

In an engine according to the prior art, with an air supply system of the type described above, a sensor is normally provided for measuring ambient pressure, and is placed, for example, in the air intake 10. The measured value of ambient pressure AMP is used by an engine control and management device. This is because this ambient pressure value has an effect on both the air intake and the discharge of the burnt gases. In the case of the air intake, if the outside pressure is lower, at high altitude for example, the filling of the cylinders is less satisfactory. In the case of the exhaust, the outside pressure also affects the back-pressure on the exhaust valves 8. Thus this value of ambient pressure is important for the proper determination of the air flow in the engine air supply system. In the case of a turbocharged engine, in other words in the context of the present invention, a knowledge of this ambient pressure is also important for the control of the turbocharger and in particular for the control of the exhaust valve (not shown) which is generally fitted to a turbocharger of this kind and which serves to regulate the rotation speed of said turbocharger and consequently the boost pressure generated by said turbocharger.

In the air supply system of the turbocharged engine shown above, the heat exchange chamber 16 collects the air leaving the compressor 14 of the turbocharger. As mentioned above, this heat exchange chamber 16 is placed upstream of the butterfly valve 18. Conventionally, a pressure sensor measuring the pressure in the heat exchange chamber 16 is used to control the engine. This pressure is also sometimes called "BOP", for Boost Over Pressure.

According to the present invention, a number of strategies can be used to determine the ambient pressure AMP without the need for a special sensor positioned, for example, in the air intake 10. These strategies, as shown below, can be used to determine the ambient pressure simply by means of the sensor which measures the pressure in the heat exchange chamber 16.

A first strategy, known in the prior art, consists in measuring the pressure in the heat exchange chamber 16 when the engine is stationary, or if necessary during starting. In these conditions, the pressure throughout the engine air supply system is clearly equal to the ambient pressure AMP outside the engine. It is therefore easy to determine the ambient pressure AMP when the vehicle is started. The quantity of fuel to be injected into the engine for the starting phase is then determined as a function of this pressure.

Once the engine has started, the driver generally wishes to drive away, and therefore presses the accelerator. This causes the butterfly valve 18 to open. This situation is shown schematically in FIG. 2. The first curve 22 in this figure represents the angle of opening of the butterfly valve 18. In this case it is assumed that the butterfly valve moves from the closed position to the open position. In FIG. 2 it is assumed that a steady state has been established in the air supply system before the butterfly valve 18 is opened. A curve 24 represents the pressure MAP_UP in the heat exchange chamber 16, while a curve 26 indicates the pressure MAP in the intake manifold 20. When the butterfly valve 18 is closed, the pressure in the heat exchange chamber 16 is slightly higher than the ambient pressure AMP. This is because, when the butterfly valve 18 is closed, the engine is substantially idling, and the boost pressure created by the turbocharger is relatively low. The pressure MAP is lower in the intake manifold 20. This is because, on the one hand, the air from the intake manifold 20 is drawn into the cylinders 4 by the movement of the pistons 2, and, on the other hand, the inlet of the intake manifold 20 is closed by the butterfly valve 18. A low pressure is therefore established in the intake manifold 20. When the butterfly valve 18 opens, the pressure in the intake manifold 20 rises immediately due to the drawing of air from the heat exchange chamber 16 due to the low pressure.

As shown by the curve 24, the pressure MAP_UP in the heat exchange chamber 16 decreases when the butterfly valve 18 is opened, since the heat exchange chamber 16 is effectively linked with the depressurized intake manifold 20, thus causing a pressure drop. This pressure then rises a gain, and in steady operation the pressure in the heat exchange chamber 16 is equal to the pressure in the intake manifold 20, since the corresponding chambers communicate freely with each other, the butterfly valve 18 being open and not impeding the free flow of air from the heat exchange chamber 16 towards the intake manifold 20. Conventionally, the opening of the butterfly valve 18 creates a larger air flow into the engine and therefore a larger flow of burnt gases in the exhaust. The turbocharger is actuated and the compressor 14 compresses the air entering through the air intake 10. Thus the pressures in the intake manifold 20 and in the heat exchange chamber 16 become higher than the ambient pressure AMP.

It can therefore be observed that, when the butterfly valve 18 is opened, the pressure MAP_UP in the heat exchange chamber 16 is equal to the ambient pressure AMP twice. This original finding is used in the present invention. Since the pressure sensor of the heat exchange chamber 16 can also measure the ambient pressure AMP in these special conditions, it appears unnecessary to provide a special sensor for measuring this ambient pressure AMP. The problem which then arises is that of determining the points of intersection of the curve 24 with the curve of ambient pressure AMP.

In order to determine the value of the ambient pressure AMP, the invention proposes, in one embodiment, the determination of the instant at which the value of the pressure in the heat exchange chamber 16 is minimal. The pressure in the heat exchange chamber 16 then reaches the value of the ambient pressure AMP after a certain time interval $\Delta t$. The value of $\Delta t$ is essentially a function of the engine speed N. In order to determine the ambient pressure AMP, the value of the pressure MAP_UP in the heat exchange chamber 16 at an instant shifted by an interval $\Delta t = f(N)$ is taken after the minimum pressure in the heat exchange chamber 16 has been observed (see FIG. 3).

This calculation method can be integrated in an algorithm and programmed into the engine control and management device. In this case, provision is made to store the result of each determination of the ambient pressure AMP performed. It is not essential to store all the measurements in the memory, provided that the last measurement is stored. This value of ambient pressure AMP is then called $AMP_{n-1}$. When the engine control and management device detects an opening of the butterfly valve 18, the pressure MAP_UP in the heat exchange chamber 16 is monitored. A check is made, in particular, as to whether this value is falling below the stored value $AMP_{n-1}$. The instant at which the pressure MAP_UP in the heat exchange chamber 16 becomes minimal is then determined. After this, it is assumed that the newly measured value of ambient pressure, $AMP_n$, is the value of the pressure in the heat exchange chamber 16 at the instant $t_0+\Delta t$, where $t_0$ is the instant at which the pressure in the heat exchange chamber 16 is minimal. The value of Δt is supplied by the control and management device as a function of the engine speed. This value is approximately in the range from several milliseconds to several tens of milliseconds.

When the butterfly valve is first opened, in other words when the ambient pressure $AMP_1$ is determined, the value $AMP_0$ is taken to be the value of the ambient pressure measured before or during the starting of the engine, as mentioned above.

It is also possible to determine the value of the ambient pressure AMP from the value of the pressure MAP_UP in the heat exchange chamber 16 measured in other conditions. Thus, for example, it is possible to measure the ambient pressure AMP when the butterfly valve 18 is closed. After the butterfly valve 18 has been closed, and after a period which allows the pressure within the heat exchange chamber 16 to stabilize, it is observed that:

$$AMP=MAP\_UP+\Delta P$$

It is known that the value of ΔP varies, in particular, as a function of the engine speed. By way of example, and purely for the purpose of indicating an order of magnitude, we may find that $\Delta P \approx -4$ mbar in idling conditions and $\Delta P \approx -14$ mbar in the vicinity of 6000 r.p.m.

The preceding equation giving the value of the ambient pressure AMP as a function of the pressure MAP_UP in the heat exchange chamber 16 when the butterfly valve 18 is closed is true at low speed, since, in this case, the exhaust gas pressure is low and the turbocharger is therefore unable to create a high boost pressure in the heat exchange chamber 16. Similarly, the relation remains true at high speed, with the butterfly valve 18 still closed, since in this case a recirculation valve is opened to avoid any risk of excess pressure upstream of the butterfly valve 18. This shows why it is necessary to wait for a certain time after the closing of the butterfly valve before applying the above equation. In particular, it is necessary to provide for the case in which the recirculation valve opens, and therefore to leave time for it to open.

FIG. 4 shows the closing of the butterfly valve 18. A curve 22' represents the opening angle of the butterfly valve 18 and the curves 24' and 26' represent, respectively, the pressure MAP_UP in the heat exchange chamber 16 and the pressure MAP in the intake manifold 20. It will be noted that the pressure MAP_UP in the heat exchange chamber 16 passes through a maximum value immediately after the closing of the butterfly valve 18. This is explained, in particular, by the fact that, when the butterfly valve 18 is closed, the air which previously flowed freely from the heat exchange chamber 16 towards the intake manifold 20 is suddenly blocked by the butterfly valve 18. This air therefore accumulates in the heat exchange chamber 16, creating an excess pressure therein. The pressure MAP in the intake manifold 20 logically decreases, since the air supply to the intake manifold 20 has been stopped and the movement of the pistons 2 in the cylinders 4 continues to draw air out of this intake manifold 20.

A final strategy may be used to supply a value of the ambient pressure AMP to the engine control and management device. This fourth strategy is used when the preceding three strategies cannot be used, in other words in the case where the butterfly valve 18 remains constantly in an intermediate position and the driver does not lift his foot from the accelerator. This case typically corresponds to the climbing of a regular gradient. This occurs very rarely. This is because, in mountainous areas, the gradient is not always regular, and this necessitates gear shifts. Even though this case is infrequent, it can be provided for here. In this case the control takes place in open loop mode. The vehicle is assumed to be climbing a slope with a substantially constant gradient. It is then possible to estimate the variation of altitude of the vehicle, as a function of its speed for example. By way of example, it is possible to provide for a variation of ambient pressure of the order of 1 mbar per minute. This corresponds to a variation of altitude of 10 meters every minute. This is the case when climbing a slope of 10% at a speed of 60 km/hr. This open-loop measurement is then made until the butterfly valve 18 is opened or is closed again.

By applying the method according to the invention described above in the form of a non-restrictive example, it is possible to dispense with the use of an ambient pressure sensor in a vehicle by using the four strategies which have been described. This represents a significant saving, constituting approximately 5% to 10% of the cost of the sensors used to monitor the air flows in the air supply system of a turbocharged engine.

Even if a pressure sensor is still used to measure the ambient pressure, the method according to the invention can be used to monitor the sensors indicating the ambient air pressure and the pressure within the heat exchange chamber 16.

The present invention is particularly advantageous in an engine fitted with an electrically controlled butterfly valve. This is because it is necessary to have a sensor for measuring the pressure in the heat exchange chamber 16 in such an engine.

The present invention is not limited to the embodiment described above in the form of a non-restrictive example. On the contrary, it relates to all variant embodiments which can be produced by those skilled in the art.

Thus, for example, other strategies could be used to determine the ambient pressure. The present invention essentially relates to the determination of this ambient pressure when the butterfly valve is opened. In the strategy described with respect to such an opening, the ambient pressure can be determined in a different way. For example, it is possible to choose another characteristic point on the curve of pressure in the heat exchange chamber 16 as the starting point. For example, the starting point from which the pressure in the heat exchange chamber 16 decreases can be chosen. It is also possible to choose the point at which, after reaching its minimum value, said pressure returns to the value which it had before the opening of the butterfly valve.

The invention claimed is:

1. A method for determining the ambient pressure in a turbocharged engine having a butterfly valve (18) placed between a heat exchange chamber (16) and an intake manifold (20), a compressor (14) being provided to compress the air in the heat exchange chamber (16) and the engine being fitted with means for indicating the pressure in the heat exchange chamber (16), characterized in that it comprises the following steps:

detecting an opening of the butterfly valve (18), measuring the pressure (MAP_UP) in the heat exchange chamber (16), determining the ambient pressure (AMP) by measuring the pressure (MAP_UP) in the heat exchange chamber (16) at a predetermined instant defined with respect to a characteristic point on the curve (24, 24') of pressure (MAP_UP) in the heat exchange chamber (16) as a function of time, the ambient pressure (AMP) then being equal to the pressure measured in the heat exchange chamber (16).

2. The determination method as claimed in claim 1, characterized in that each determination of the ambient pressure is stored, and in that a further determination is only carried out if the pressure (MAP_UP) measured in the heat exchange chamber (16) falls below the stored value of the ambient pressure measured previously ($AMP_{n-1}$).

3. The determination method as claimed in claim 1, characterized in that, during the measurement of the pressure (MAP_UP) in the heat exchange chamber (16), a check is made, in a predetermined period after the opening of the butterfly valve (18), to ensure that the measured pressure in the heat exchange chamber MAP_UP is passing through a minimum value.

4. The determination method as claimed in claim 3, characterized in that the measurement of the pressure (MAP_UP) in the heat exchange chamber (16) for determining the ambient pressure (AMP) is made after a predetermined elapsed time Δt after the detection of the minimum value of the pressure (MAP_UP) in the heat exchange chamber (16).

5. The determination method as claimed in claim 4, characterized in that the elapsed time Δt is defined as a function of the engine speed.

6. The determination as claimed in claim 1, characterized in that the measurement of the ambient pressure (AMP) is made before the engine is started, this ambient pressure (AMP) then being equal to the pressure (MAP_UP) in the heat exchange chamber.

7. The determination method as claimed in claim 1, characterized in that the ambient pressure (AMP) is also measured when the butterfly valve (18) is closed, the pressure difference between the pressure (MAP_UP) measured in the heat exchange chamber (16) and the ambient pressure (AMP) then being determined as a function of the engine speed.

8. The determination method as claimed in claim 1, characterized in that, when the butterfly valve (18) remains substantially in the same position for a long period, the ambient pressure (AMP) is calculated in open-loop mode, being decreased by a given value for each time interval.

9. The determination method as claimed in claim 2, characterized in that, during the measurement of the pressure (MAP_UP) in the heat exchange chamber (16), a check is made, in a predetermined period after the opening of the butterfly valve (18), to ensure that the measured pressure in the heat exchange chamber MAP_UP is passing through a minimum value.

10. The determination method as claimed in claim 9, characterized in that the measurement of the pressure (MAP_UP) in the heat exchange chamber (16) for determining the ambient pressure (AMP) is made after a predetermined elapsed time Δt after the detection of the minimum value of the pressure (MAP_UP) in the heat exchange chamber (16).

11. The determination method as claimed in claim 10, characterized in that the elapsed time Δt is defined as a function of the engine speed.

12. The determination as claimed in claim 11, characterized in that the measurement of the ambient pressure (AMP) is made before the engine is started, this ambient pressure (AMP) then being equal to the pressure (MAP_UP) in the heat exchange chamber.

* * * * *